US011325561B2

(12) United States Patent
Tanaka et al.

(10) Patent No.: US 11,325,561 B2
(45) Date of Patent: May 10, 2022

(54) WEBBING RETRACTOR

(71) Applicant: KABUSHIKI KAISHA TOKAI-RIKA-DENKI-SEISAKUSHO, Aichi (JP)

(72) Inventors: Takahiro Tanaka, Aichi (JP); Shinichi Okubo, Aichi (JP); Wataru Yanagawa, Aichi (JP); Takanori Tanaka, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 255 days.

(21) Appl. No.: 16/634,362

(22) PCT Filed: Jun. 8, 2018

(86) PCT No.: PCT/JP2018/022125
§ 371 (c)(1),
(2) Date: Jan. 27, 2020

(87) PCT Pub. No.: WO2019/026426
PCT Pub. Date: Feb. 7, 2019

(65) Prior Publication Data
US 2020/0384946 A1      Dec. 10, 2020

(30) Foreign Application Priority Data

Aug. 3, 2017   (JP) .............................. JP2017-150956

(51) Int. Cl.
*B60R 22/46*   (2006.01)

(52) U.S. Cl.
CPC ................................ *B60R 22/4628* (2013.01)

(58) Field of Classification Search
CPC ................ B60R 22/46; B60R 22/4628; B60R 2022/4647
See application file for complete search history.

(56) References Cited

U.S. PATENT DOCUMENTS

| 2020/0231115 | A1* | 7/2020 | Tanaka | ................ B60R 22/4604 |
| 2020/0269806 | A1* | 8/2020 | Hall | .................... B60R 22/4628 |
| 2020/0282948 | A1* | 9/2020 | Yanagawa | ........... B60R 22/4628 |
| 2021/0114549 | A1* | 4/2021 | Yanagawa | ........... B60R 22/4628 |

FOREIGN PATENT DOCUMENTS

| JP | 2007-522030 A | 8/2007 |
| JP | 2015-054651 A | 3/2015 |

* cited by examiner

*Primary Examiner* — Sang K Kim
(74) *Attorney, Agent, or Firm* — Roberts Calderon Safran & Cole P.C.

(57) ABSTRACT

In a present webbing retractor, when a stopper is pushed and moved by a conical portion of a moving member, the stopper abuts a moving member main body of the moving member between a rotating member and an axial direction distal end of a cylinder, and moreover, is moved toward a side of a portion of engagement of the moving member main body with first teeth and second teeth of the rotating member, while deforming the moving member main body. Due thereto, expansion, toward a side in a direction orthogonal to an axis, of the moving member main body can be suppressed.

10 Claims, 13 Drawing Sheets

WEBBING RETRACTOR

CROSS-REFERENCE TO RELATED APPLICATIONS

The present application is a U.S. National Phase of PCT/JP2018/022125 filed on Jun. 8, 2018, claiming priority under 35 USC 119 from Japanese Patent Application No. 2017-150956 filed Aug. 3, 2017, the disclosure of which is incorporated by reference herein.

TECHNICAL FIELD

The present invention relates to a webbing retractor in which a spool is rotated in a take-up direction due to a rotating member being rotated.

BACKGROUND ART

For example, in the webbing retractor disclosed in following Patent Document 1, plural mass bodies that are spherical are disposed at the inner side of a magazine so as to be lined-up in a row. When these mass bodies are moved by the pressure of a fluid such as a gas or the like and come out from the tubular final section of the magazine, the mass bodies engage with a driving wheel in order, and the driving wheel is rotated. Due thereto, a belt shaft is rotated in a direction of taking up a webbing, and the tension of the webbing is increased.

On the other hand, when a slider is pushed by the first mass body that rotates the driving wheel, the slider is moved toward the opening end side of the tubular final section. Due thereto, at the time when a driving cylinder is moved a given distance within the magazine and reaches the opening end of the tubular final section, the driving cylinder can be prevented from coming out of the opening end of the tubular final section, and the fluid coming out from the opening end of the tubular final section is suppressed.

By the way, the plural mass bodies and the driving cylinder are compressively deformed by receiving the pressure of the fluid. Moreover, when the mass bodies that are compressively deformed come out from the opening end of the tubular final section, the mass bodies expand toward a side in a direction orthogonal to the axis of the tubular final section (a side in the opening radial direction of the opening end of the tubular final section). Due thereto, the length from the leading mass body to the driving cylinder is shorter than in the state before the plural mass bodies and the driving cylinder are compressed by the pressure of the fluid. Therefore, the length, from the leading mass body to the driving cylinder in the state before being compressed by the pressure of the fluid, must be made to be sufficiently long.

PRIOR ART DOCUMENTS

Patent Documents

Japanese Patent Application National Publication No. 2007-522030

SUMMARY OF INVENTION

Technical Problem

In view of the above-described circumstances, an object of the present invention is to provide a webbing retractor that can suppress expansion, toward a side in a direction orthogonal to the axis, of a moving member that has come out from an axial direction distal end of a cylinder.

Solution to Problem

A webbing retractor of a first aspect of the present invention comprises: a spool on which a webbing of a seatbelt device is taken up due to the spool being rotated in a take-up direction; a rotating member that rotates toward one side such that the spool is rotated in the take-up direction; a cylinder that is formed in a tubular shape; a fluid supplier that is provided at an axial direction proximal end side of the cylinder, and that supplies fluid to an inner side of the cylinder at a time of a vehicle emergency; a moving member that is provided at the inner side of the cylinder, and that, by pressure of the fluid, is moved toward an axial direction distal end side of the cylinder, and rotates the rotating member toward the one side; and an expansion suppressor that suppresses expansion, toward a side in a direction orthogonal to an axis, of the moving member by abutting or being abutted by the moving member that is in a state of having come out by a predetermined length from an axial direction distal end of the cylinder.

In accordance with the webbing retractor of the first aspect of the present invention, one of the expansion suppressor or the moving member abuts the other, in a state in which the predetermined length of the moving member has come out from the axial direction distal end of the cylinder. Due thereto, expansion, toward the side in the direction orthogonal to the axis, of the moving member that has come out from the axial direction distal end of the cylinder can be suppressed.

Advantageous Effects of Invention

As described above, in the webbing retractor relating to the present invention, expansion, toward the side in the direction orthogonal to the axis, of the moving member that has come out from the axial direction distal end of the cylinder can be suppressed.

DESCRIPTION OF EMBODIMENTS

First Embodiment

A first embodiment of the present invention is described next on the basis of the respective drawings of FIG. 1 through FIG. 9. Note that, in the respective drawings, arrow FR indicates the front side of a vehicle to which a present webbing retractor 10 is applied, arrow OUT indicates a vehicle transverse direction outer side, and arrow UP indicates the vehicle upper side. Further, in the respective drawings, arrow A indicates a take-up direction that is the rotating direction of a spool 18 at the time when the spool 18 takes up a webbing 20, and arrow B indicates a pull-out direction that is opposite the take-up direction. Moreover, arrow C indicates a length direction distal end side of a stopper 92 that serves as a first expansion suppressor and structures an expansion suppressor.

Structure of Present Embodiment

Figure 1:
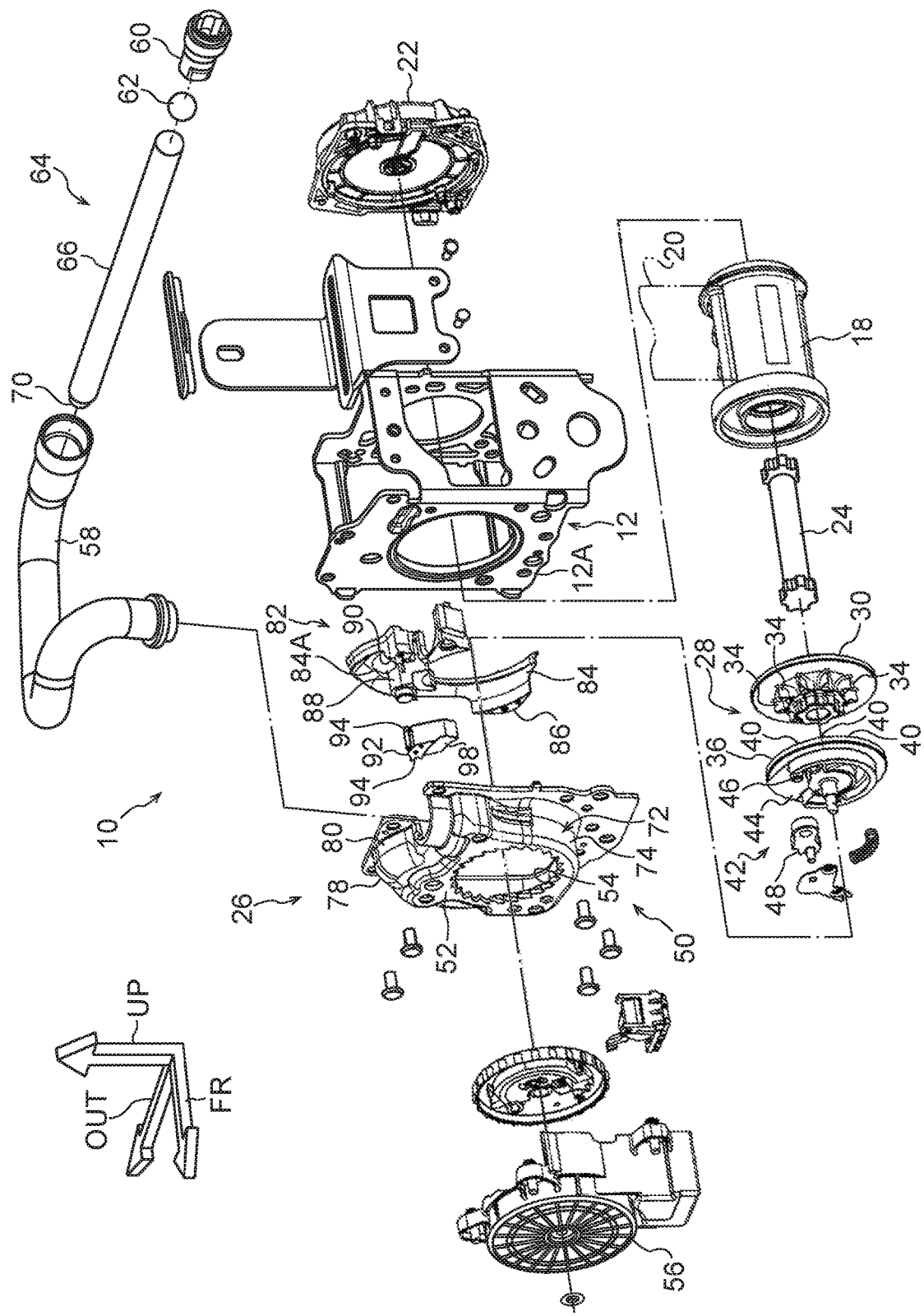
FIG. 1 is an exploded perspective view of a webbing retractor relating to a first embodiment of the present invention.

As shown in FIG. 1, the webbing retractor 10 relating to the present embodiment has a frame 12. The frame 12 is fixed to a vehicle lower side portion of a center pillar (not illustrated) that serves as the vehicle body of the vehicle.

Further, the spool 18 is provided at the frame 12. The spool 18 is formed in a substantially cylindrical tubular shape, and can rotate around the central axis thereof (in the arrow A direction and the arrow B direction in FIG. 1). The length direction proximal end portion of the webbing 20 that is shaped as an elongated belt is anchored on the spool 18. When the spool 18 is rotated in the take-up direction (the arrow A direction in FIG. 1 and the like), the webbing 20 is taken up, from the length direction proximal end side thereof, onto the spool 18. Further, the length direction distal end side of the webbing 20 extends from the spool 18 toward the vehicle upper side, and passes-through a slit hole that is formed in a through-anchor (not illustrated), which is supported at the center pillar at the vehicle upper side of the frame 12, and is folded-over toward the vehicle lower side.

Moreover, the length direction distal end portion of the webbing 20 is anchored on an anchor plate (not illustrated). The anchor plate is formed from a metal plate member of iron or the like, and is fixed to the floor portion (not illustrated) of the vehicle or to a frame member of a seat (not illustrated) that corresponds to the present webbing retractor 10, or the like.

Further, a seatbelt device for a vehicle, to which the present webbing retractor 10 is applied, has a buckle device (not illustrated). The buckle device is provided at the vehicle transverse direction inner side of the seat (not illustrated) to which the present webbing retractor 10 is applied. The webbing 20 is applied to the body of a passenger due to a tongue (not illustrated), which is provided at the webbing 20, being engaged with the buckle device in a state in which the webbing 20 is placed around the body of the passenger who is seated in the seat.

Further, as shown in FIG. 1, a spring housing 22 is provided at the vehicle rear side of the frame 12. A spool urger (not illustrated) such as a spiral spring or the like is provided at the inner side of the spring housing 22. The spool urger is engaged with the spool 18 directly or indirectly, and the spool 18 is urged in the take-up direction (the arrow A direction in FIG. 1) by the urging force of the spool urger.

Moreover, the present webbing retractor 10 has a torsion bar 24 that structures a force limiter mechanism. The vehicle rear side portion of the torsion bar 24 is disposed at the inner side of the spool 18, and is connected to the spool 18 in a state in which relative rotation with respect to the spool 18 is limited. In contrast, the vehicle front side portion of the torsion bar 24 passes-through a hole formed in the frame 12, and extends to the outer side (the vehicle front side) of the frame 12.

A rotating member 28 of a pretensioner 26 is provided at the vehicle front side of the frame 12. The rotating member 28 has a first rotating portion 30. The first rotating portion 30 is disposed coaxially with the spool 18. The vehicle front side portion of the torsion bar 24 is connected to the first rotating portion 30. Relative rotation, with respect to the vehicle front side portion of the torsion bar 24, of the rotating member 28 is limited. Further, the first rotating portion 30 of the rotating member 28 has plural first teeth 34. These first teeth 34 are formed at a predetermined interval around the central axis of the first rotating portion 30.

Moreover, a second rotating portion 36 that, together with the first rotating portion 30, structures the rotating member 28, is provided at the vehicle front side of the first rotating portion 30. The second rotating portion 36 has plural second teeth 40. These second teeth 40 are formed at a predetermined interval around the central axis of the second rotating portion 36. As seen from the central axis direction of the rotating member 28, the respective second teeth 40 are disposed at the substantial centers of the regions between the first teeth 34 of the first rotating portion 30 that are adjacent to one another around the central axis of the first rotating portion 30 of the rotating member 28. In this state, the second rotating portion 36 is connected to the first rotating portion 30, and relative movement of the second rotating portion 36 with respect to the first rotating portion 30 is limited.

Further, the vehicle front side portion of the second rotating portion 36 is made to be a lock base 44 of a locking mechanism 42. The lock base 44 has a lock pawl 48. The lock pawl 48 is supported by a boss 46 that is formed at the lock base 44, and can rotate around the boss 46.

On the other hand, a cover plate 50 that structures both the locking mechanism 42 and the pretensioner 26 is fixed to a leg plate 12A that is at the vehicle front side of the frame 12. The cover plate 50 opens toward the vehicle rear side. A bottom plate 52 of the cover plate 50 faces the frame 12 in a state of being apart from the frame 12 toward the vehicle front side. A ratchet hole 54 is formed in the bottom plate 52. Ratchet teeth are formed at the inner peripheral portion of the ratchet hole 54. When the lock pawl 48 of the lock base 44 is rotated one way around the boss 46, the distal end portion of the lock pawl 48 meshes-together with a ratchet tooth of the ratchet hole 54. Due thereto, rotation of the lock base 44 in the pull-out direction (the arrow B direction in FIG. 1 and the like) is limited, and rotation of the spool 18 in the pull-out direction is limited indirectly.

Further, a sensor holder 56 of the locking mechanism 42 is provided at the vehicle front side of the cover plate 50. The sensor holder 56 opens toward the vehicle rear side, and is fixed to the frame 12 directly or indirectly via the cover plate 50. Respective parts, which structure a sensor mechanism that detects an emergency state of the vehicle, are housed at the inner side of the sensor holder 56. When the sensor mechanism within the sensor holder 56 is operated at the time of an emergency of the vehicle, interlockingly with the rotation of the lock base 44 of the locking mechanism 42 in the pull-out direction, the lock pawl 48 of the lock base 44 is rotated one way around the boss 46.

On the other hand, the webbing retractor 10 has a cylinder 58 that serves as a tubular member and structures the pretensioner 26. The cylinder 58 is formed in the shape of a cylindrical tube. The axial direction proximal end portion of the cylinder 58 is disposed at the vehicle rear upper side of the frame 12. A micro gas generator 60 (hereinafter the micro gas generator 60 is called the "MGG 60") that serves as a fluid supplier is inserted in the axial direction proximal end portion of the cylinder 58. The MGG 60 is, via an ECU that serves as a controller, electrically connected to a collision sensing sensor that is provided at the vehicle (neither of which is illustrated). When impact at the time of a vehicle collision is sensed by the collision sensing sensor, the MGG 60 is operated by the ECU, and gas, which is one form of a fluid and is generated at the MGG 60, is supplied to the inner side of the cylinder 58.

A sealing ball 62 that serves as a piston is disposed at the inner side of the cylinder 58 of the pretensioner 26. The sealing ball 62 is formed from a synthetic resin material. The shape of the sealing ball 62 in the state in which load is not being imparted to the sealing ball 62 is substantially spherical. The internal space of the cylinder 58 is partitioned by the sealing ball 62 into a region that is further toward the axial direction proximal end side than the sealing ball 62 and a region that is further toward the axial direction distal end side than the sealing ball 62. When the MGG 60 is operated, gas that is generated at the MGG 60 is supplied to between the MGG 60 and the sealing ball 62 at the cylinder 58. When, due thereto, the internal pressure is raised between the MGG 60 and the sealing ball 62 at the cylinder 58, the sealing ball 62 is moved toward the axial direction distal end side of the cylinder 58, and is compressed and deformed in the axial direction of the cylinder 58.

Further, a moving member 64 is disposed at the inner side of the cylinder 58 of the pretensioner 26. The moving member 64 is formed from a synthetic resin material, and can deform by receiving external force. The moving member 64 is disposed further toward the axial direction distal end side of the cylinder 58 than the sealing ball 62. When the sealing ball 62 is moved toward the axial direction distal end side of the cylinder 58, the moving member 64 is pushed by the sealing ball 62 and is moved toward the axial direction distal end side of the cylinder 58.

Moreover, the moving member 64 has a moving member main body 66. The moving member main body 66 is formed in the shape of a rod that is solid cylindrical. A small diameter portion 68 is formed at the axial direction distal end of the moving member main body 66. The small diameter portion 68 is formed in a solid cylindrical shape. The outer diameter dimension of the small diameter portion 68 is made to be smaller than the outer diameter dimension of the moving member main body 66, and the small diameter portion 68 is disposed coaxially with the moving member main body 66. A conical portion 70 is formed at the axial direction distal end of the moving member 64 at the small diameter portion 68 (the end at the side, which is opposite the moving member main body 66, of the small diameter portion 68). The conical portion 70 is formed in the shape of a cone or in the shape of a truncated cone. The outer diameter dimension of the conical portion 70 becomes smaller toward the axial direction distal side of the moving member 64 at the conical portion 70 (the side of the conical portion 70 that is opposite the small diameter portion 68).

On the other hand, the cylinder 58 of the pretensioner 26 bends at an axial direction intermediate portion thereof. The axial direction distal end portion of the cylinder 58 is disposed at a vehicle front upper side at the vehicle front side of the frame 12, and is nipped and held by the cover plate 50 and the frame 12. The axial direction distal end of the cylinder 58 opens to the substantially vehicle lower side (in more detail, the side of a direction that is inclined toward the vehicle transverse direction outer side with respect to the vehicle lower side).

Figure 2:
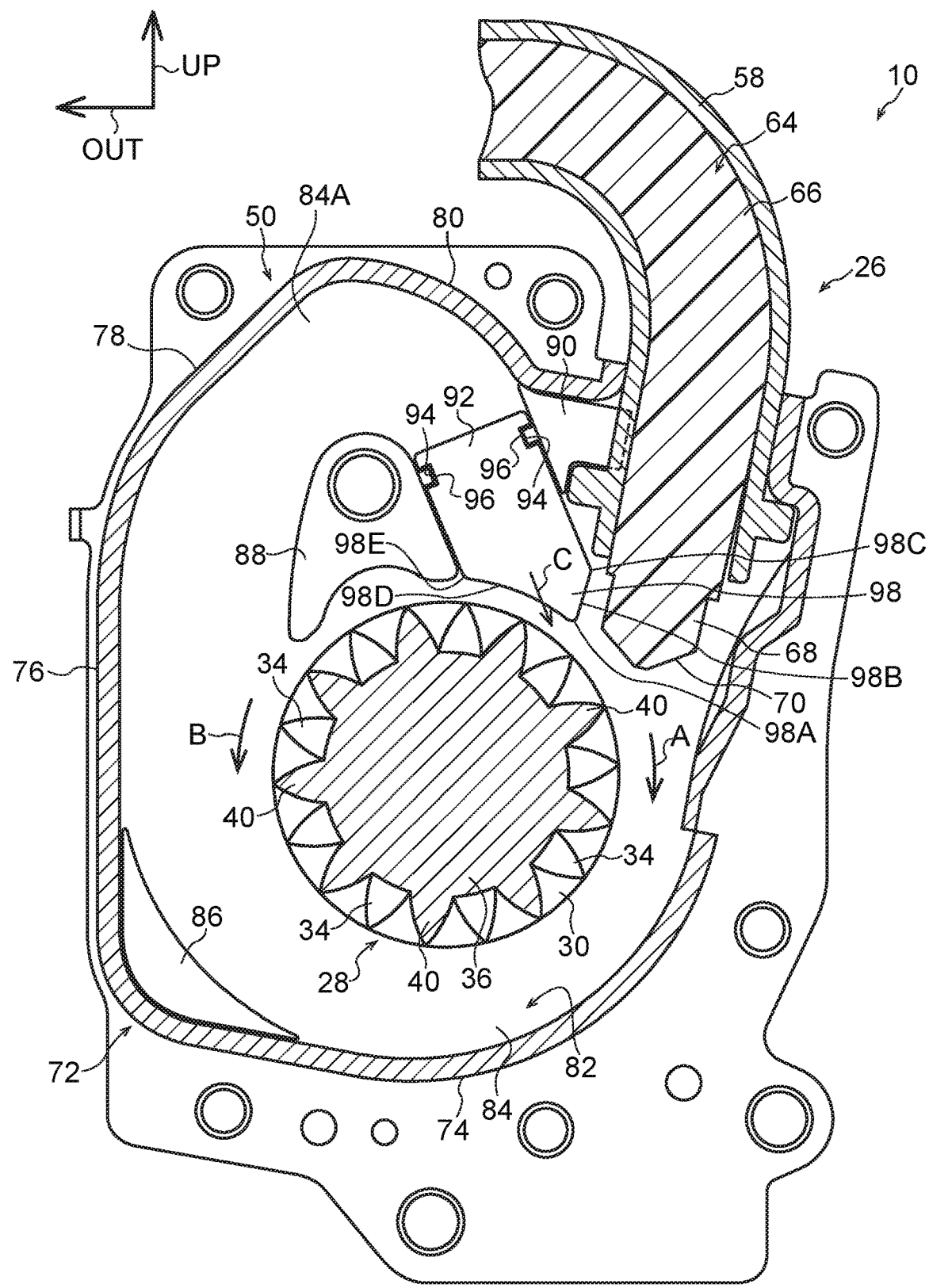
FIG. 2 is a side view in which the inner side of a cover plate is seen from a vehicle front side, and shows a state in which a small diameter portion and a conical portion of a moving member have come out from an axial direction distal end of a cylinder.
Figure 3:
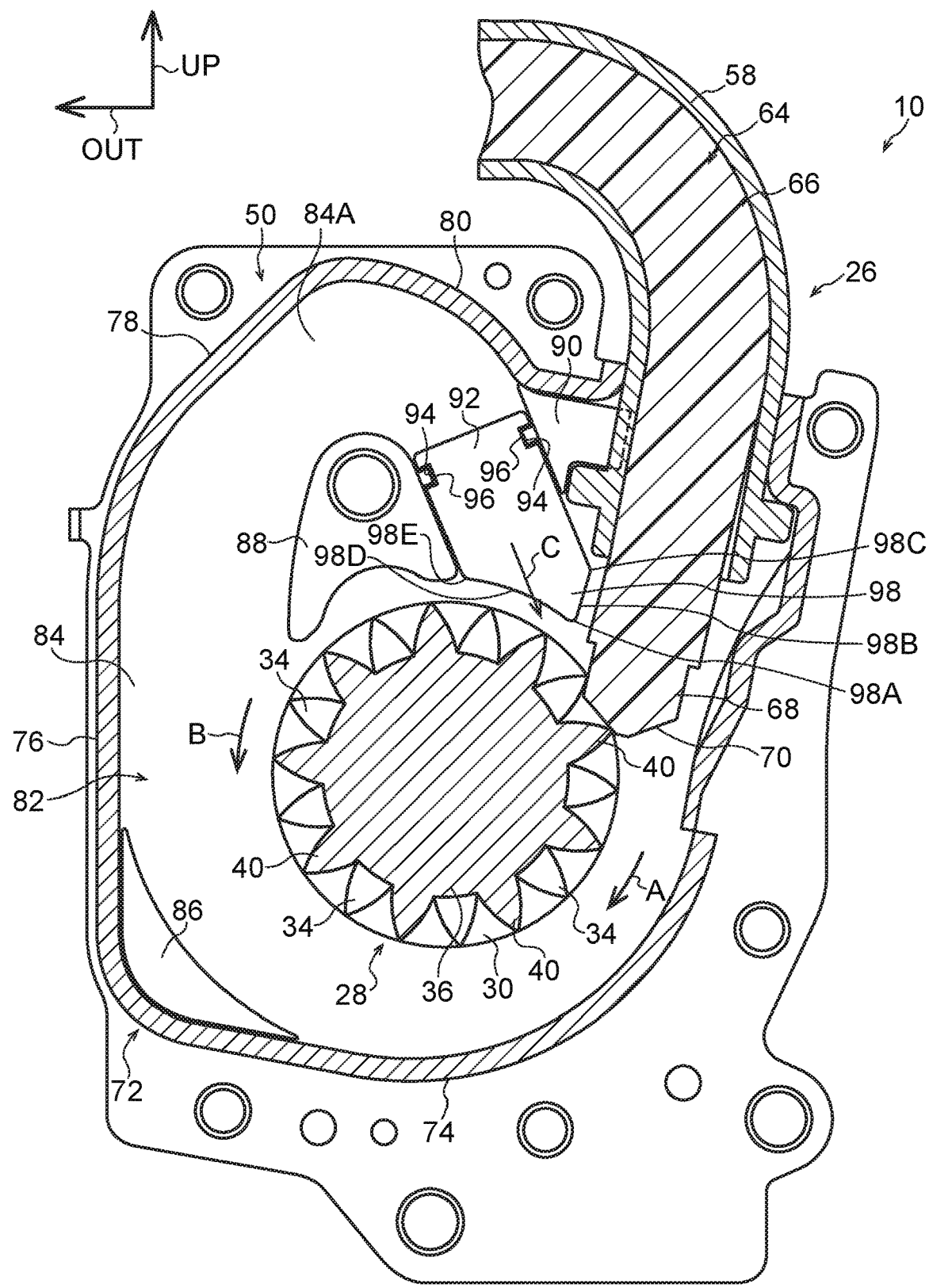
FIG. 3 is a side view that corresponds to FIG. 2, and shows a state in which the conical portion of the moving member abuts a second tooth of a second rotating portion of a rotating member.

When, in the state in which the moving member 64 has reached the axial direction distal end of the cylinder 58, the moving member 64 is further pushed and moved by the sealing ball 62, as shown in FIG. 2, the moving member 64 comes out from the axial direction distal end of the cylinder 58 toward the vehicle lower side, and enters into the inner side of the cover plate 50. In this state, when the conical portion 70 of the moving member 64 is moved further toward the vehicle lower side, as shown in FIG. 3, the conical portion 70 abuts the first tooth 34 of the first rotating portion 30 or the second tooth 40 of the second rotating portion 36 of the rotating member 28. In this state, due to the first tooth 34 or the second tooth 40 being pushed toward the vehicle lower side by the moving member 64, rotational force from the moving member 64 and in the take-up direction (the arrow A direction in FIG. 3 and the like) is imparted to the rotating member 28. Due thereto, the rotating member 28 is rotated in the take-up direction (the arrow A direction in FIG. 3 and the like), and the moving member 64 is moved further toward the vehicle lower side by the pressure from the sealing ball 62.

Figure 4:
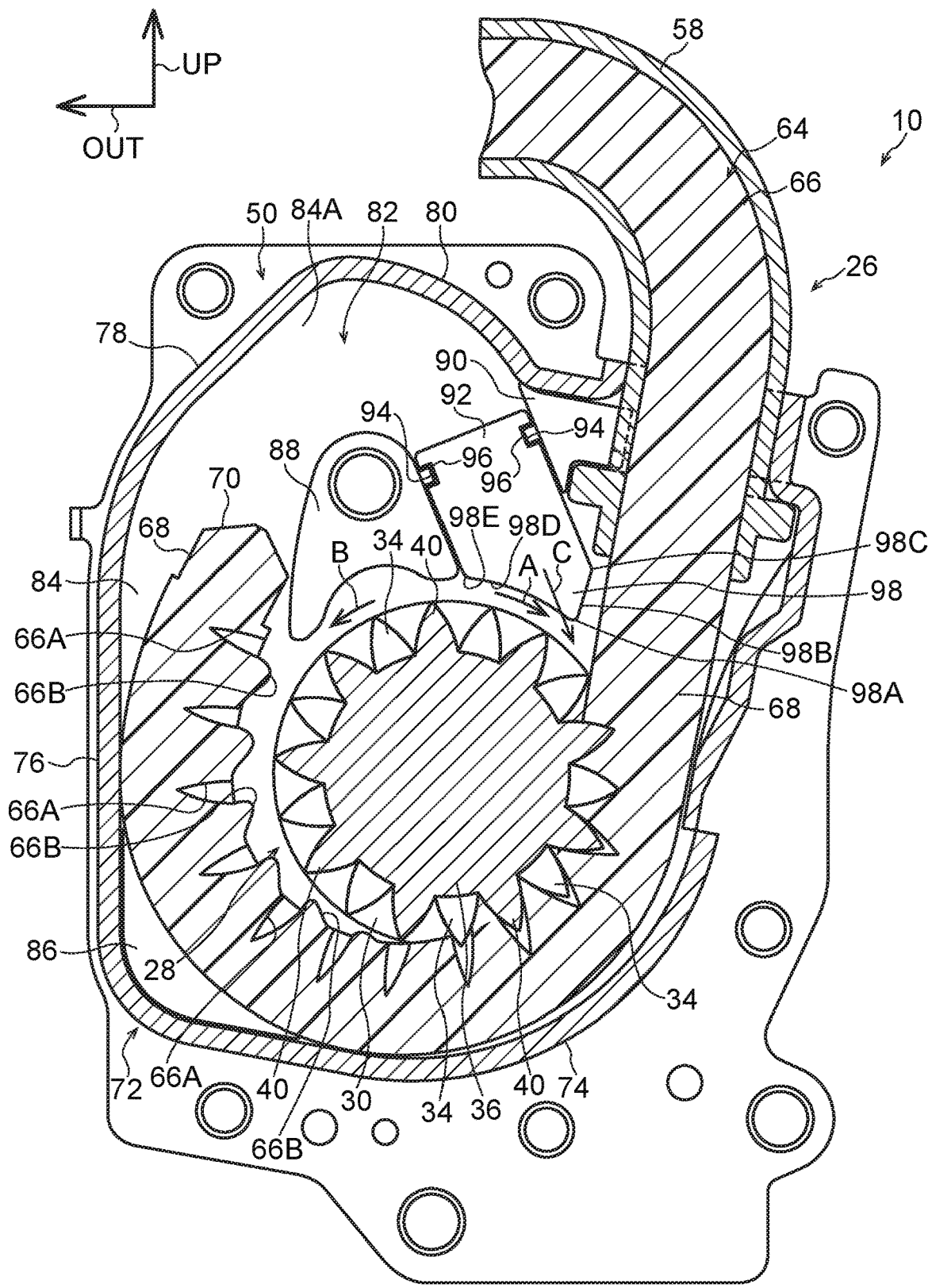
FIG. 4 is a side view that corresponds to FIG. 3, and shows a state in which the conical portion of the moving member has moved to between the rotating member and an outer side wall portion of a side wall.

In this way, due to the moving member 64 being moved toward the vehicle lower side and the rotating member 28 being rotated in the take-up direction, as shown in FIG. 4, the first teeth 34 of the first rotating portion 30 and the second teeth 40 of the second rotating portion 36 of the rotating member 28 pierce the moving member 64, and, in this state, due to the moving member 64 being moved further toward the vehicle lower side, rotational force in the take-up direction is further imparted to the rotating member 28, and the rotating member 28 is rotated further in the take-up direction.

On the other hand, as shown in FIG. 1 and FIG. 2, the cover plate 50 has a side wall 72 that structures a guide. The side wall 72 is provided along the outer peripheral portion of the bottom plate 52 of the cover plate 50, and, as shown in FIG. 2, the rotating member 28 is disposed at the inner side of the side wall 72. The side wall 72 has a lower wall portion 74, an outer side wall portion 76, an upper wall outer side portion 78, and an upper wall inner side portion 80. The lower wall portion 74 is the vehicle lower side portion of the side wall 72, and the outer side wall portion 76 is the vehicle transverse direction outer side portion of the side wall 72. Further, the upper wall outer side portion 78 and the upper wall inner side portion 80 are the vehicle upper side portion of the side wall 72. The upper wall outer side portion 78 is inclined toward the vehicle upper side with respect to the vehicle transverse direction inner side. The upper wall inner side portion 80 is inclined toward the vehicle lower side with respect to the vehicle transverse direction inner side.

Further, as shown in FIG. 2, a guide member 82, which, together with the side wall 72, structures the guide, and which serves as a second expansion suppressor and structures the expansion suppressor, is provided at the inner side of the cover plate 50. The guide member 82 has a base portion 84. The base portion 84 faces the leg plate 12A at the vehicle front side of the leg plate 12A of the frame 12. Therefore, the interval between the base portion 84 and the bottom plate 52 of the cover plate 50 along the vehicle longitudinal direction is made to be smaller than the interval between the leg plate 12A and the bottom plate 52 of the cover plate 50. A first guiding portion 86, a second guiding portion 88 and a third guiding portion 90 are provided at the vehicle front side of the base portion 84.

The first guiding portion 86 is provided at the vehicle lower side end portion of the vehicle transverse direction outer side end portion at the inner side of the side wall 72. Further, the second guiding portion 88 is provided at the vehicle upper side of the rotating member 28 at the inner side of the side wall 72. Moreover, the third guiding portion 90 is provided at the vehicle lower side of the upper wall inner side portion 80 of the cover plate 50, at the vehicle transverse direction inner side of the second guiding portion 88. The vehicle transverse direction outer side surface of the third guiding portion 90 continues from the vehicle transverse direction outer side surface of the upper wall inner side portion 80 of the cover plate 50. Further, the interval between the second guiding portion 88 and the third guiding portion 90 is made to be larger than the outer diameter dimension of the moving member main body 66 of the moving member 64, and the moving member main body 66 can enter in between the second guiding portion 88 and the third guiding portion 90 (see FIG. 8).

Figure 9:
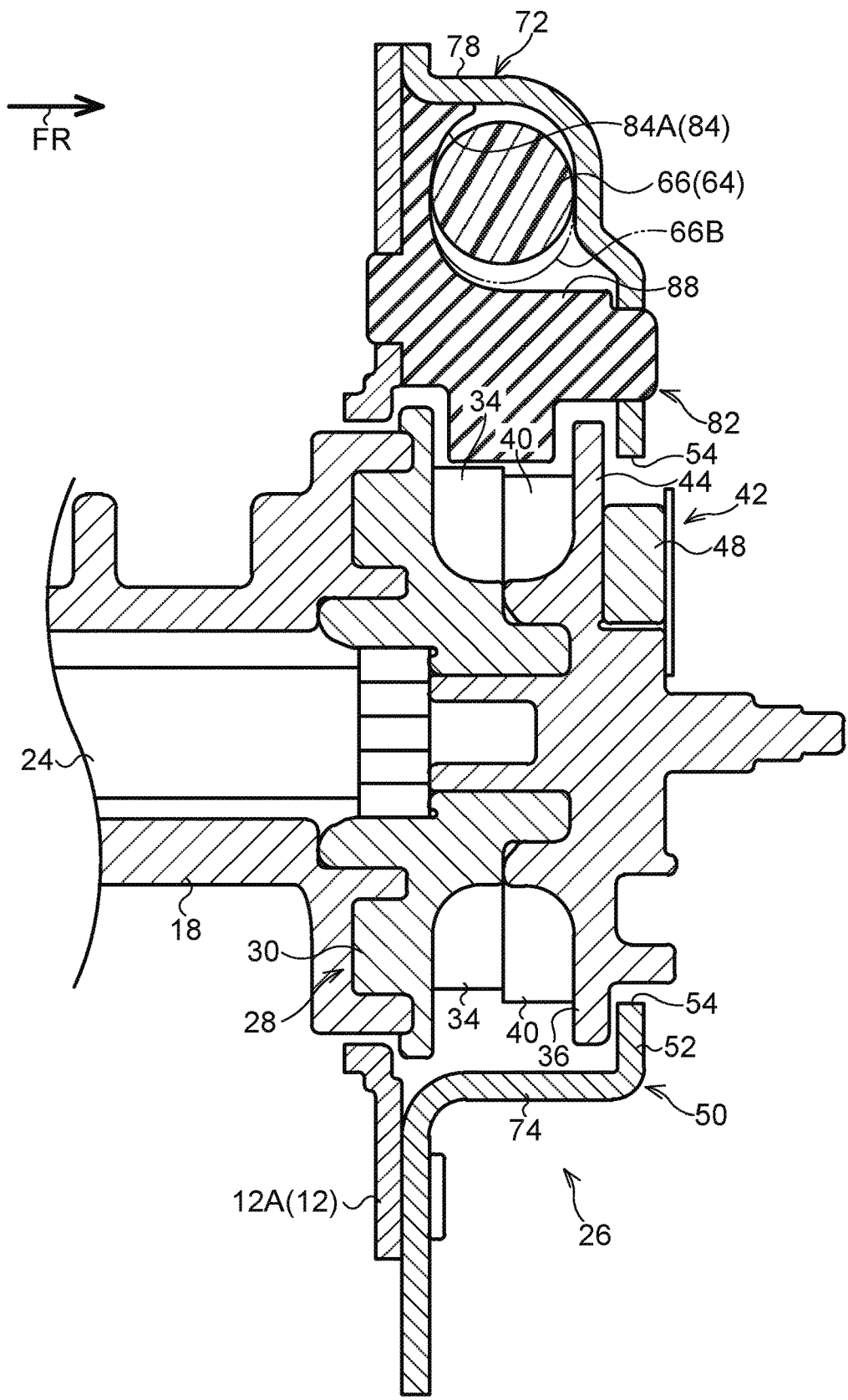
FIG. 9 is a cross-sectional view along line 9-9 of FIG. 8.

Further, as shown in FIG. 9, the interval between the vehicle front side surface of a base upper portion 84A, which is the vehicle upper side portion of the second guiding portion 88 at the base portion 84 of the guide member 82, and the vehicle rear side surface (inner side surface) of the bottom plate 52 of the cover plate 50, is made to be substantially the same as the outer diameter dimension of the moving member main body 66 (strictly speaking, is made to be slightly larger than the outer diameter dimension of the moving member main body 66) in the state in which load from the outer side is not being imparted to the moving member main body 66 of the moving member 64 (the state of not being deformed by load). Further, as shown in FIG. 9, the vehicle front side surface of the base upper portion 84A is bent with the center of curvature being the central axis side of the moving member main body 66 in the state in which the axial direction distal end side portion of the moving member main body 66 is disposed between the base upper portion 84A and the bottom plate 52 of the cover plate 50. The vehicle upper side portion and the vehicle lower side portion at the vehicle front side surface of the base upper portion 84A project-out further toward the vehicle front side than the vehicle vertical direction intermediate portion at the vehicle front side surface of the base upper portion 84A. Due thereto, the gap between the outer peripheral surface of the moving member main body 66 that is disposed between the base upper portion 84A and the bottom plate 52 of the cover plate 50, and the vehicle front side surface of the base upper portion 84A, is made to be small.

On the other hand, as shown in FIG. 9, the interval between the side wall 72 of the cover plate 50 and the second guiding portion 88 of the guide member 82 at the space that is at the vehicle front side of the base upper portion 84A is made to be larger than the outer diameter dimensions of the moving member main body 66. As shown in FIG. 4 and the like, when the first teeth 34 of the first rotating portion 30 or the second teeth 40 of the second rotating portion 36 of the rotating member 28 pierce the moving member main body 66, grooves 66A that correspond to the shapes of the first teeth 34 or the second teeth 40 are formed in the moving member main body 66, and, at portions that are further toward the axial direction proximal end side of the moving member main body 66 than these grooves 66A, bulging portions 66B, at which the moving member main body 66 deforms so as to bulge-out toward the opening direction sides of the grooves 66A, are formed at the moving member main body 66. The interval between the side wall 72 of the cover plate 50 and second guiding portion 88 of the guide member 82 at the space that is at the vehicle front side of the base upper portion 84A is set in consideration of the outer diameter dimension of the moving member main body 66 at the portions where the bulging portions 66B are formed at the moving member main body 66. The portions where the bulging portions 66B are formed at the moving member main body 66 can move toward the vehicle front side of the base upper portion 84A.

Further, as shown in FIG. 2, the stopper 92, which serves as the first expansion suppressor and structures the expansion suppressor, is provided between the second guiding portion 88 and the third guiding portion 90 of the guide member 82. The stopper 92 is formed in the shape of a rod from a synthetic resin material that is harder than the moving member 64. The length direction of the stopper 92 (the arrow C direction in FIG. 2 and the like) is tilted toward the vehicle lower side with respect to the vehicle transverse direction inner side. The stopper 92 can move in the length direction of the stopper 92 by being guided by the second guiding portion 88 and the third guiding portion 90 of the guide member 82.

Figure 7:
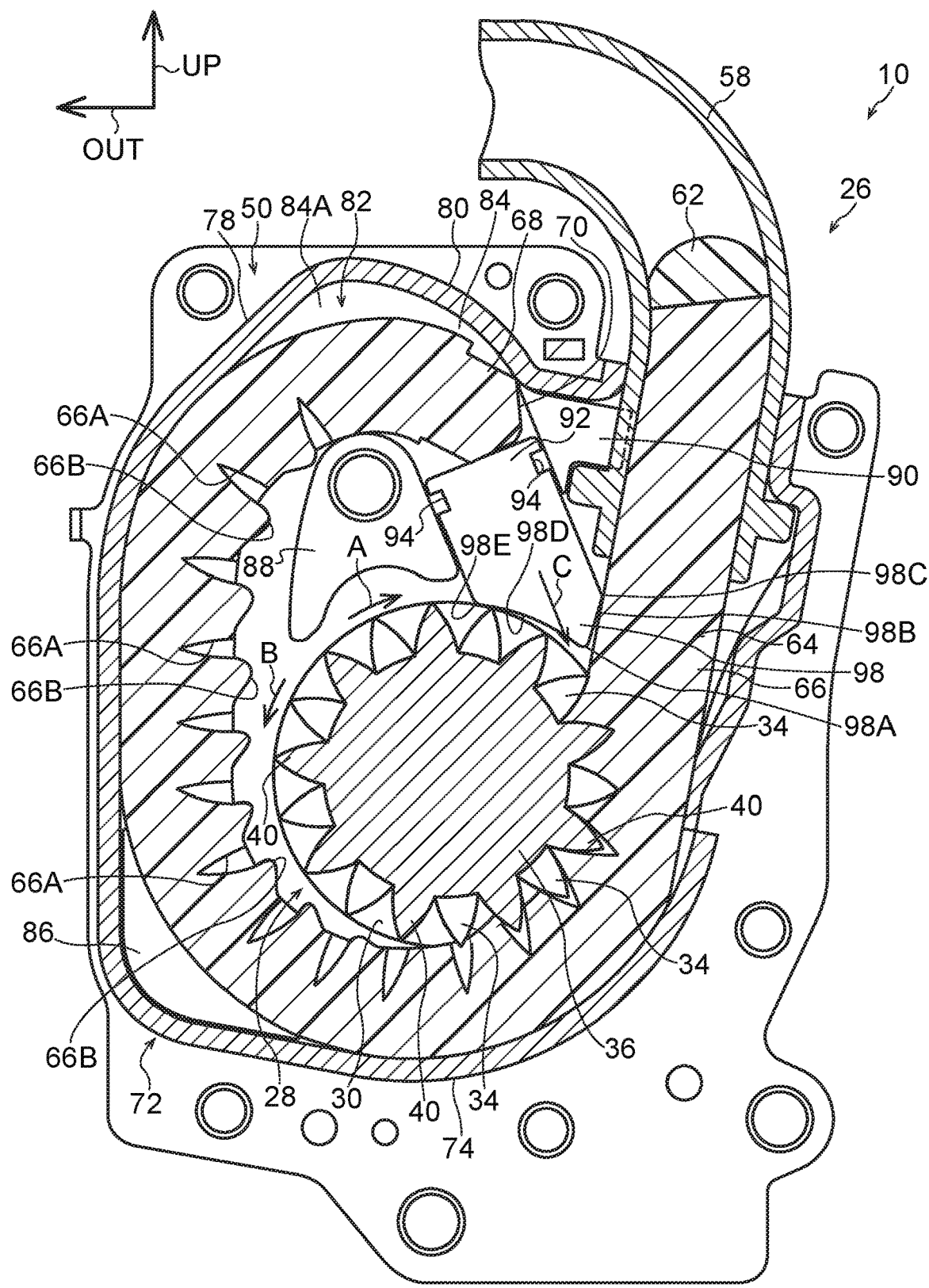
FIG. 7 is a side view that corresponds to FIG. 6 and shows a state in which the stopper, which is pushed by the conical portion of the moving member, is moved and abuts a moving member main body of the moving member.
Figure 8:
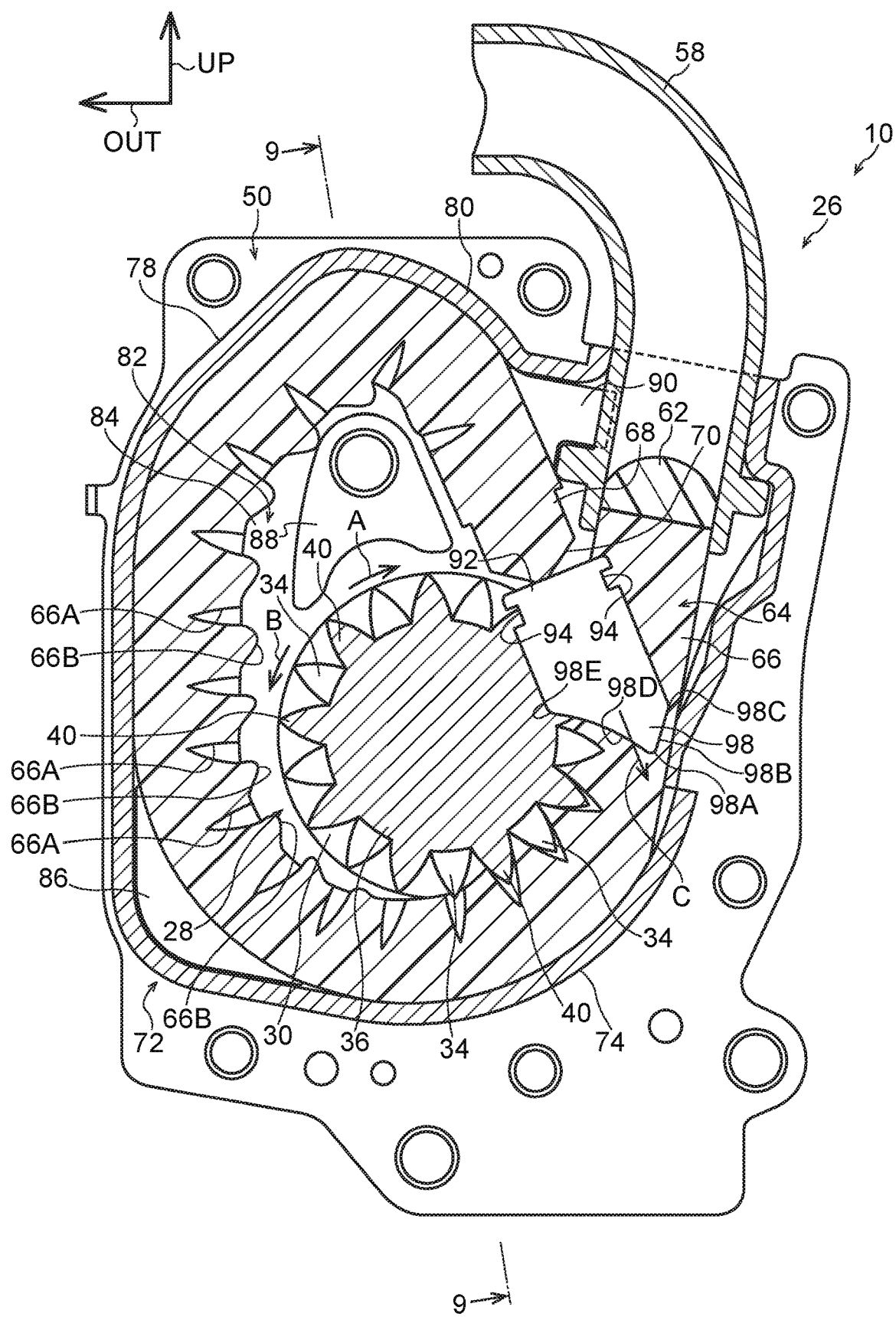
FIG. 8 is a side view that corresponds to FIG. 7 and shows a state in which the stopper has been moved to a portion of engagement of the moving member main body and the rotating member.

Moreover, a pair of concave portions 94 are formed in the length direction proximal end portion of the stopper 92 (the end portion, which is at the side in the direction opposite arrow C in FIG. 2 and the like, at the stopper 92). The concave portions 94 open at the outer peripheral surface of the stopper 92. Ribs 96 are disposed in the pair of concave portions 94 respectively. One of the ribs 96 projects-out from the second guiding portion 88 of the guide member 82 in a direction that is inclined toward the vehicle upper side with respect to the vehicle transverse direction inner side. The other of the ribs 96 projects-out from the third guiding portion 90 of the guide member 82 in a direction that is inclined toward the vehicle lower side with respect to the vehicle transverse direction outer side. Due to these ribs 96 being disposed in the concave portions 94, the stopper 92 is held by the second guiding portion 88 and the third guiding portion 90 of the guide member 82. As shown in FIG. 7 and FIG. 8, the stopper 92 can move toward a length direction side thereof due to the ribs 96 being sheared.

Moreover, as shown in FIG. 2, a tapered portion 98 is formed at the length direction distal end portion of the stopper 92 (the end portion at the arrow C direction side in FIG. 2 and the like of the stopper 92). The tapered portion 98 is made to be a tapered shape as seen from the vehicle front side. The portion, which is further toward the vehicle transverse direction inner side of the tapered portion 98 than a distal end 98A in the length direction of the stopper 92, at the tapered portion 98 is made to be an inner side portion 98B. The length direction proximal end of the stopper 92 at the inner side portion 98B is made to be an inner side proximal end 98C. The inner side portion 98B is inclined toward the vehicle transverse direction outer side with respect to the axial direction of the moving member 64 that is between the axial direction distal end of the cylinder 58 and the vehicle lower side portion of the side wall 72 of the cover plate 50. When the stopper 92 is moved toward the length direction distal end side (the arrow C direction side in FIG. 2 and the like), the inner side proximal end 98C of the tapered portion 98 abuts the moving member 64 earlier than the distal end 98A of the tapered portion 98 abuts the moving member 64.

On the other hand, the portion of the tapered portion 98, which portion is further toward the vehicle transverse direction outer side of the tapered portion 98 than the distal end 98A, is made to be an outer side portion 98D. The length direction proximal end of the stopper 92 at the outer side portion 98D is made to be an outer side proximal end 98E. The outer side portion 98D is inclined toward the vehicle transverse direction inner side with respect to the length direction distal end side of the stopper 92. Therefore, in the state in which the inner side proximal end 98C of the tapered portion 98 abuts the moving member 64, the outer side proximal end 98E of the tapered portion 98 does not enter onto the locus of rotation of the first teeth 34 and the second teeth 40 of the rotating member 28. Moreover, the formed positions of the inner side proximal end 98C and the outer side proximal end 98E of the tapered portion 98 are set such that the inner side proximal end 98C of the tapered portion 98 abuts the moving member 64 when the outer side proximal end 98E of the tapered portion 98 enters onto the locus of rotation of the first teeth 34 and the second teeth 40 of the rotating member 28 due to the stopper 92 being moved toward the length direction distal end side.

By the way, as shown from FIG. 5 through FIG. 8, the sealing ball 62 and the moving member 64 are compressively deformed in the axial direction of the cylinder 58 by the pressure of the gas that is supplied from the MGG 60. Here, as shown in FIG. 8, the axial direction length of the moving member 64, including the conical portion 70 and the small diameter portion 68, and the pressure of the gas that is supplied from the MGG 60 are set such that, in the state in which the tapered portion 98 of the stopper 92 has engaged with as far as the central axis side of the moving member 64 at the axial direction proximal end side portion of the moving member main body 66 of the moving member 64, the axial direction proximal end of the moving member 64 is disposed at the inner side of the cylinder 58.

Operation, Effects of Present Embodiment

Operation and effects of the present embodiment are described next.

In the present webbing retractor 10, at the time of a vehicle collision which is one form of a time of a vehicle emergency, when the MGG 60 of the pretensioner 26 is operated by the ECU, high-pressure gas is instantaneously supplied from the MGG 60 to the inner side of the cylinder 58. When the sealing ball 62 is moved toward the axial direction distal end side of the cylinder 58 by the pressure of this gas, the moving member 64 is pushed by the sealing ball 62, and the moving member 64 is moved toward the axial direction distal end side of the cylinder 58.

Due to the moving member 64 being moved toward the axial direction distal end side, the conical portion 70 of the moving member 64 comes out from the axial direction distal end of the cylinder 58 toward the vehicle lower side, and the conical portion 70 of the moving member 64 abuts the first tooth 34 or the second tooth 40 (see FIG. 3). Due thereto, due to the first tooth 34 or the second tooth 40 of the rotating member 28 being pushed toward the vehicle lower side by the conical portion 70 of the moving member 64, rotational force in the take-up direction (the arrow A direction in FIG. 3 and the like) from the moving member 64 is imparted to the rotating member 28. Due thereto, the rotating member is rotated in the take-up direction (the arrow A direction in FIG. 4 and the like).

Moreover, as shown in FIG. 4, among the plural first teeth 34 or second teeth 40 of the rotating member 28, the first teeth 34 or the second teeth 40, which are further toward the pull-out direction side (the arrow B direction side in FIG. 2 and the like) than the first tooth 34 or the second tooth 40 that is pushed by the conical portion 70 of the moving member 64, bite-into or pierce toward the radial direction central side of the moving member 64 from the outer peripheral surface of the moving member main body 66 of the moving member 64 due to the rotation of the rotating member 28 in the take-up direction.

In this way, due to the moving member 64, which the first teeth 34 or the second teeth 40 have bitten-into or pierced, being moved toward the vehicle lower side, rotational force in the take-up direction is further imparted to the rotating member 28, and the rotating member 28 is rotated further in the take-up direction (the arrow A direction in FIG. 4 and the like). The rotation of the rotating member 28 in the take-up direction is transmitted via the torsion bar 24 to the spool 18, and the spool 18 is rotated in the take-up direction. Due thereto, the webbing 20 is taken up onto the spool 18, and the force of restraining the passenger by the webbing 20 is increased.

Figure 5:
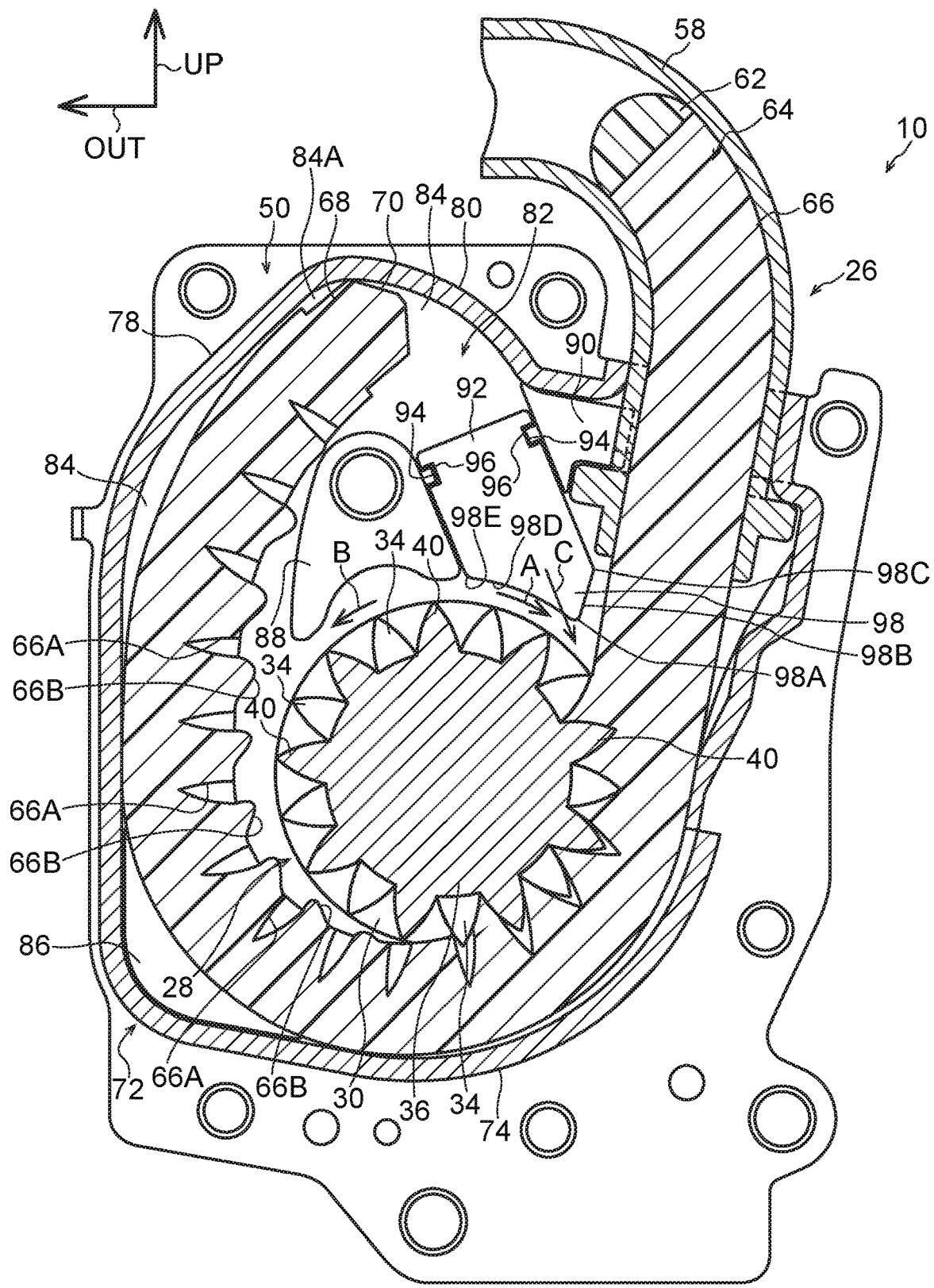
FIG. 5 is a side view that corresponds to FIG. 4 and shows a state in which an axial direction proximal end of the moving member at the conical portion abuts an upper wall outer side portion of the side wall.

On the other hand, when the conical portion 70 of the moving member 64 is moved further toward the vehicle lower side than the rotating member 28 due to the moving member 64 being pushed by the sealing ball 62, the conical portion 70 of the moving member 64 is guided by the lower wall portion 74 of the side wall 72 of the cover plate 50, the first guiding portion 86 of the guide member 82, and the outer side wall portion 76 of the side wall 72, and is moved toward the vehicle upper side (see FIG. 4 and FIG. 5). Due thereto, as shown in FIG. 5, the axial direction proximal end of the moving member 64 at the conical portion 70 (the small diameter portion 68 side end of the moving member 64 at the conical portion 70) abuts the upper wall outer side portion 78 of the side wall 72.

Figure 6:
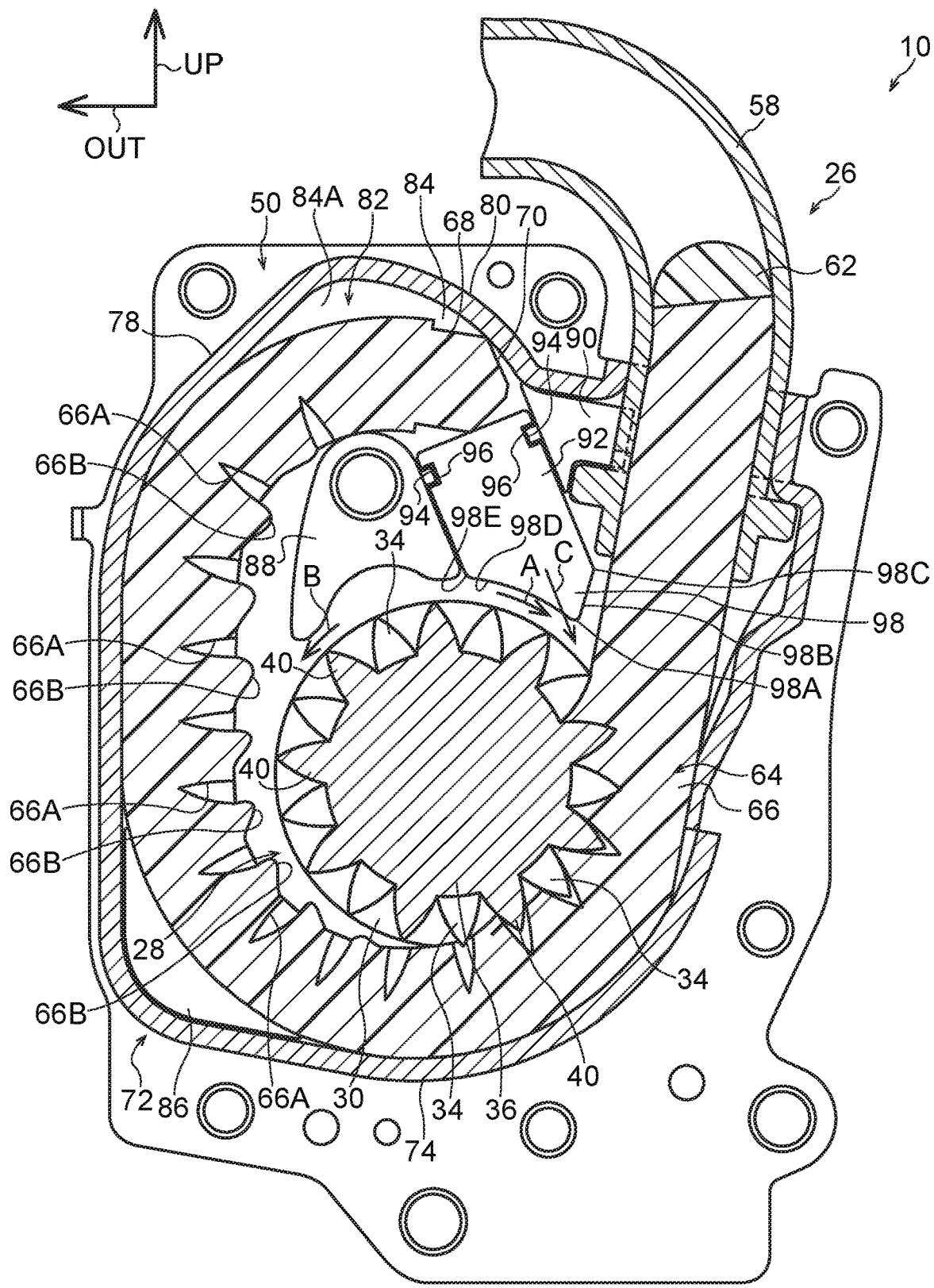
FIG. 6 is a side view that corresponds to FIG. 5 and shows a state in which the axial direction proximal end of the moving member at the conical portion abuts a length direction proximal end of a stopper.

In this state, when the moving member 64 is pushed further by the sealing ball 62, the axial direction proximal end of the moving member 64 at the conical portion 70 is guided by the upper wall outer side portion 78 and is moved in a direction that is inclined toward the vehicle lower side with respect to the vehicle transverse direction inner side. Due thereto, as shown in FIG. 6, the side, which is opposite the portion of the axial direction proximal end of the moving member 64 that abuts the upper wall outer side portion 78, at the conical portion 70 abuts the length direction proximal end of the stopper 92, and the axial direction distal end portion of the moving member main body 66 of the moving member 64 abuts the second guiding portion 88 of the guide member 82.

Next, from this state, when the moving member 64 is pushed further by the sealing ball 62, and the pushing force, which is imparted from the conical portion 70 of the moving member 64 to the length direction proximal end of the stopper 92, becomes greater than the shearing strength of the ribs 96 of the second guiding portion 88 and the third guiding portion 90 of the guide member 82, the ribs 96 are sheared. Due thereto, as shown in FIG. 7, the stopper 92 is, by the pushing force from the conical portion 70, guided by the second guiding portion 88 and the third guiding portion 90 and is moved.

When the stopper 92 is moved in this way, the inner side proximal end 98C of the tapered portion 98 of the stopper 92 abuts the moving member main body 66 of the moving member 64 at further toward the vehicle upper side than the first tooth 34 or the second tooth 40, which contacts the moving member main body 66 of the moving member 64 the furthest toward the pull-out direction side (the arrow B direction side in FIG. 7), among the first teeth 34 and the second teeth 40 of the rotating member 28. Due thereto, at the vehicle lower side of the axial direction distal end of the cylinder 58, the space in which the moving member main body 66 can expand toward the vehicle transverse direction outer side becomes smaller.

By the way, the pressure of the gas that is supplied from the MGG 60 into the cylinder 58 is applied to the moving member 64 via the sealing ball 62, and, due thereto, the moving member 64 is compressed toward an axial direction side. Therefore, due to the moving member 64 coming out from the axial direction distal end of the cylinder 58 toward the vehicle lower side, the moving member 64 starts to expand. As described above, in the state in which the inner side proximal end 98C of the tapered portion 98 of the stopper 92 abuts the moving member main body 66 of the moving member 64, movement of the stopper 92 toward the length direction distal end side (the arrow C direction side in FIG. 7 and the like) is suppressed, and, due thereto, movement of the moving member 64 toward the axial direction distal end side is suppressed. Therefore, in this state, expansion of the moving member 64 toward the axial direction distal end side is suppressed, and the portion, which has come out from the axial direction distal end of the cylinder 58, of the moving member 64 starts to expand toward a side in a direction orthogonal to the axis of the moving member 64.

Here, the inner side proximal end 98C of the tapered portion 98 of the stopper 92 abuts the moving member main body 66 of the moving member 64, and the space, which is at the vehicle lower side of the axial direction distal end of the cylinder 58 and in which the moving member main body 66 can expand toward the vehicle transverse direction outer side, becomes smaller. Due thereto, expansion of the axial direction proximal end side portion of the moving member main body 66 toward the vehicle transverse direction outer side is suppressed.

Next, when, in this state, the stopper 92 is pushed and moved by the moving member 64, the moving member main body 66, which has come out from the axial direction distal end of the cylinder 58 toward the vehicle lower side, is pushed and deformed toward the central axis side of the moving member main body 66 by the stopper 92. Due thereto, expansion of the axial direction proximal end side portion of the moving member main body 66 toward the vehicle transverse direction outer side is further suppressed.

Moreover, in this state, the rotating member 28 is rotated in the take-up direction (the arrow A direction in FIG. 7 and the like), and the portion, which has come out from the axial direction distal end of the cylinder 58, of the moving member 64 is moved toward the vehicle lower side. Therefore, the stopper 92 that is pushing the moving member 64 is moved toward the side of the portion of engagement of the first teeth 34 and the second teeth 40 of the rotating member 28 with the moving member 64, due to at least one of rotation of the rotating member 28 in the take-up direction or movement of the moving member 64 toward the vehicle lower side (see FIG. 8).

In this way, due to the stopper 92 being moved toward the side of the portion of engagement of the first teeth 34 and the second teeth 40 of the rotating member 28 with the moving member 64, the tapered portion 98 of the stopper 92 engages with the moving member main body 66 so as to pierce or bite into the moving member main body 66, and, moreover, rotation of the rotating member 28 in the take-up direction and movement of the moving member 64 toward the vehicle lower side (movement of the moving member 64 toward the axial direction distal end side) are suppressed. Due thereto, movement of the portion, which is further toward the axial direction proximal end side than the portion engaged by the tapered portion 98 of the stopper 92, of the moving member main body 66 toward the axial direction distal end side of the moving member 64 is suppressed.

Here, as shown in FIG. 8, the axial direction length of the moving member 64, including the conical portion 70 and the small diameter portion 68, and the pressure of the gas that is supplied from the MGG 60 are set such that, in the state in which the tapered portion 98 of the stopper 92 has engaged with as far as the central axis side of the moving member 64 at the axial direction proximal end side portion of the moving member main body 66 of the moving member 64, the axial direction proximal end of the moving member 64 is disposed at the inner side of the cylinder 58. Accordingly, in this state, because the sealing ball 62 is disposed at the inner side of the cylinder 58, leaking of the gas, which is supplied from the MGG 60 into the cylinder 58, toward the side that is further toward the axial direction distal end of the cylinder 58 than the sealing ball 62 can be suppressed. Due thereto, leaking of the gas from the axial direction distal end of the cylinder 58 to the outer side of the cylinder 58 can be suppressed.

Moreover, because the sealing ball 62 can be prevented from coming out from the axial direction distal end of the cylinder 58 in this way, the axial direction length of the moving member 64 in the state before the moving member 64 is compressed by the pressure of the gas generated at the MGG 60 does not have to be made particularly long. Due thereto, the axial direction length of the cylinder 58 becoming long can be suppressed.

Further, in the present embodiment, the inner side proximal end 98C of the tapered portion 98 of the stopper 92 abuts the moving member main body 66 of the moving member 64 between the axial direction distal end of the cylinder 58 and the portion of engagement of the first teeth 34 and the second teeth 40 of the rotating member 28 with the moving member 64. Therefore, the inner side proximal end 98C of the tapered portion 98 of the stopper 92 can abut the moving member main body 66 before expansion starts or immediately after expansion starts, and, due thereto, expansion of the moving member main body 66 toward a side in a direction orthogonal to the axis can be suppressed effectively.

Moreover, the stopper 92 is moved by being pushed by the conical portion 70 of the moving member 64, and the inner side proximal end 98C of the tapered portion 98 of the stopper 92 abuts the moving member main body 66 of the moving member 64. Namely, in the state before the stopper 92 moves, the inner side proximal end 98C of the tapered portion 98 of the stopper 92 is not abutting the moving member main body 66 of the moving member 64. Therefore, the moving member 64 can smoothly move toward the axial direction distal end side, and can rotate the rotating member 28.

Further, because the stopper 92 is formed from a synthetic resin material that is harder than the moving member 64, due to the moving member main body 66 of the moving member 64 being pushed by the tapered portion 98 of the stopper 92, deformation can be caused at the moving member main body 66. Due thereto, rotation of the rotating member 28 in the take-up direction (the arrow A direction in FIG. 7 and the like) and movement of the moving member 64 toward the vehicle lower side can be suppressed effectively, and the portion, which is further toward the axial direction proximal end side than the portion engaged by the tapered portion 98 of the stopper 92, at the moving member main body 66 moving toward the axial direction distal end side can be suppressed.

Further, as shown in FIG. 9, the interval between the vehicle front side surface of the base upper portion 84A of the base portion 84 of the guide member 82, and the vehicle rear side surface (inner side surface) of the bottom plate 52 of the cover plate 50, is made to be substantially the same as the outer diameter dimension of the moving member main body 66 of the moving member 64 (strictly speaking, is made to be slightly larger than the outer diameter dimension of the moving member main body 66). Moreover, the vehicle front side surface of the base upper portion 84A is bent with the center of curvature being the central axis side of the moving member main body 66 in the state in which the axial direction distal end side portion of the moving member main body 66 is disposed between the base upper portion 84A and the bottom plate 52 of the cover plate 50, and the interval between the vehicle front side surface of the base upper portion 84A, and the outer peripheral surface of the moving member main body 66 that is disposed between the base upper portion 84A and the bottom plate 52 of the cover plate 50, is made to be small. Due thereto, expansion, in a direction orthogonal to the axis, of the portion, which is disposed between the base upper portion 84A and the bottom plate 52 of the cover plate 50, of the moving member main body 66 is suppressed by the base upper portion 84A and the bottom plate 52 of the cover plate 50.

Because expansion, in a direction orthogonal to the axis, of the axial direction distal end side portion of the moving member main body 66 is suppressed, the conical portion 70 of the moving member 64 can efficiently push the stopper 92 due to the pressure of the gas that is generated by the MGG 60 and that is received by the axial direction proximal end portion of the moving member 64. Due thereto, the ribs 96, which are within the concave portions 94 of the stopper 92, can be broken efficiently by the pressing force from the conical portion 70 of the moving member 64, and the holding of the stopper 92 by the ribs 96 can be released efficiently. Moreover, after the holding of the stopper 92 by the ribs 96 is released, the stopper 92 can be moved efficiently by the pressing force from the conical portion 70 of the moving member 64.

Note that, in the present embodiment, there is a structure in which the inner side proximal end 98C of the tapered portion 98 of the stopper 92 abuts the moving member main body 66 of the moving member 64 due to the stopper 92 being moved toward the length direction distal end side (the arrow C direction side in FIG. 2 and the like). However, there may be a structure in which, for example, the stopper 92 is disposed in advance at the inner side of the side wall 72 of the cover plate 50, at a position that can abut the moving member main body 66 of the moving member 64 that has come out from the axial direction distal end of the cylinder 58.

Second Embodiment

Figure 10:
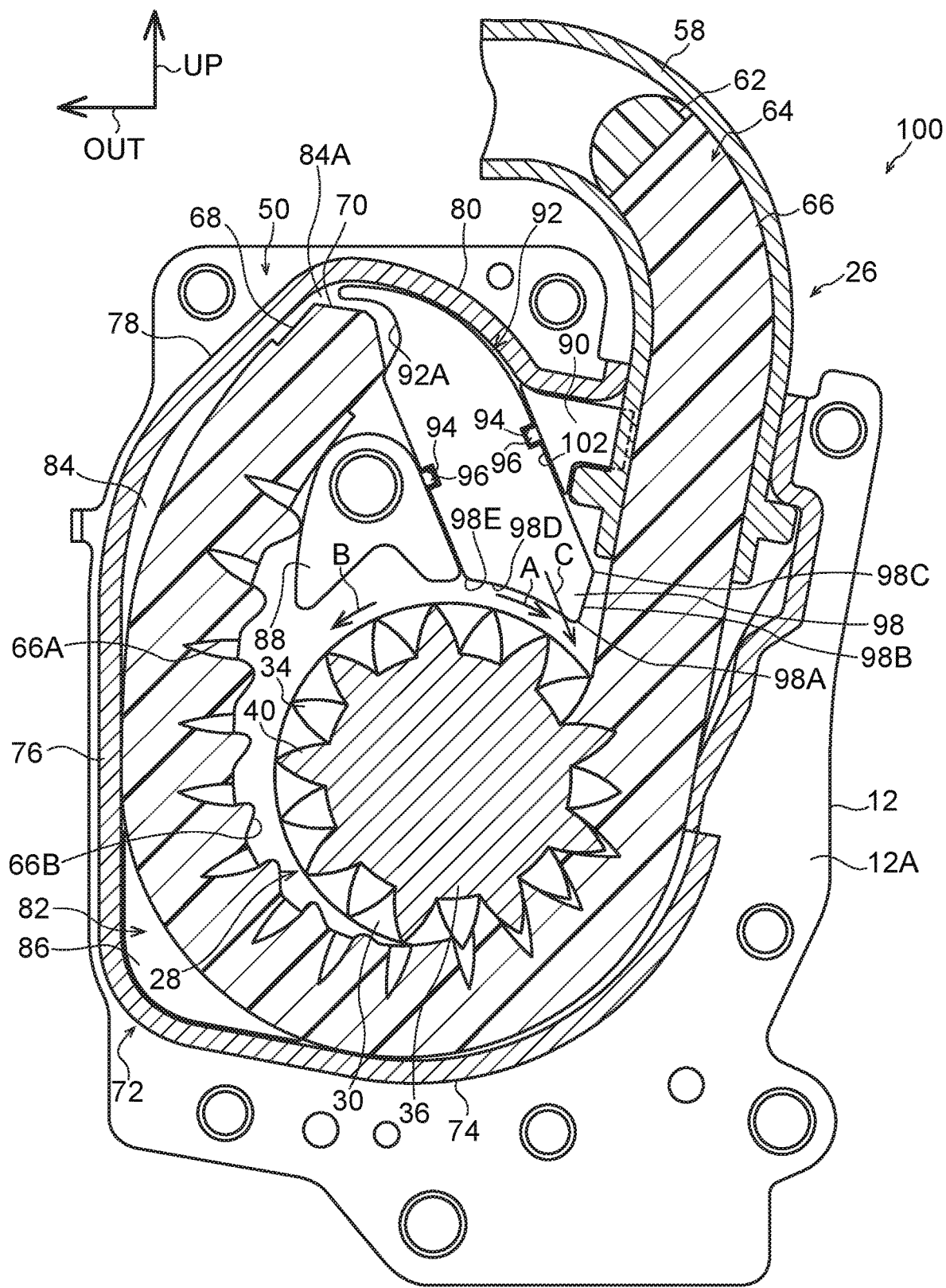
FIG. 10 is a side view showing a state in which abutment of the conical portion of the moving member with a length direction proximal end portion of the stopper has started, in a webbing retractor relating to a second embodiment of the present invention.

A state in which abutment of the conical portion 70 of the moving member 64 with the length direction proximal end portion of the stopper 92 has started, in a webbing retractor 100 relating to a second embodiment of the present invention, is shown in a side view in FIG. 10.

The webbing retractor 100 relating to the present embodiment has a structure that is substantially similar to the above-described first embodiment, but differs with respect to the following points.

As shown in FIG. 10, at the webbing retractor 100 relating to the present embodiment, the region between the upper wall inner side portion 80 of the side wall 72 of the cover plate 50, and the third guiding portion 90 of the guide member 82 and the second guiding portion 88 of the guide member 82, is made to be a moving path 102. The moving path 102 is inclined toward the vehicle lower side with respect to the vehicle transverse direction inner side.

The stopper 92 is extended at the length direction proximal end side thereof (the side opposite the arrow C direction in FIG. 10 and the like). The vehicle transverse direction inner side surface of the length direction proximal end side portion of the stopper 92 is disposed along the vehicle transverse direction outer side surfaces of the upper wall inner side portion 80 of the cover plate 50 and the third guiding portion 90 of the guide member 82. The vehicle transverse direction outer side surface of the length direction proximal end side portion of the stopper 92 is disposed along the extended surface of the vehicle transverse direction outer side surface of the second guiding portion 88 of the guide member 82.

An accommodating concave portion 92A, which serves as an accommodating portion and is substantially semicircular in cross-section, is formed at the length direction proximal end portion of the stopper 92. The accommodating concave portion 92A opens toward the vehicle front side, the vehicle rear side and the vehicle transverse direction outer side. Further, the width dimension of the length direction proximal end portion of the stopper 92 is made to be small by the accommodating concave portion 92A.

Figure 11:
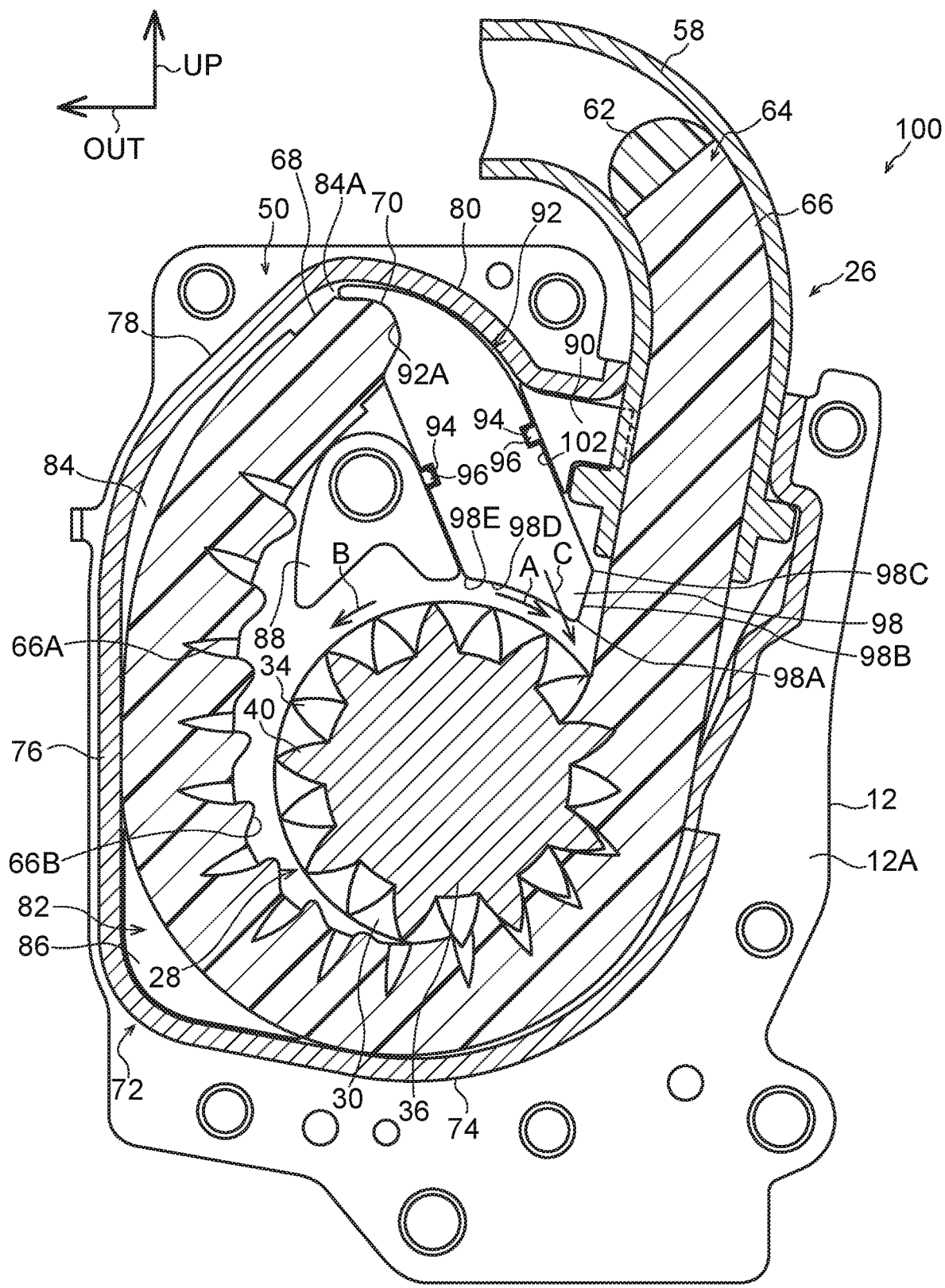
FIG. 11 is a side view that corresponds to FIG. 10 and shows a state in which the conical portion of the moving member abuts the length direction proximal end portion of the stopper.

Here, in the webbing retractor 100 relating to the present embodiment, at the time when the MGG 60 of the pretensioner 26 is operated, and the moving member 64 is pushed by the sealing ball 62, the conical portion 70 of the moving member 64 is guided by the outer side wall portion 76 of the side wall 72 of the cover plate 50 and is moved toward the vehicle upper side, and thereafter, is accommodated in (fit-together with) the accommodating concave portion 92A of the stopper 92 (see FIG. 10 and FIG. 11).

Figure 12:
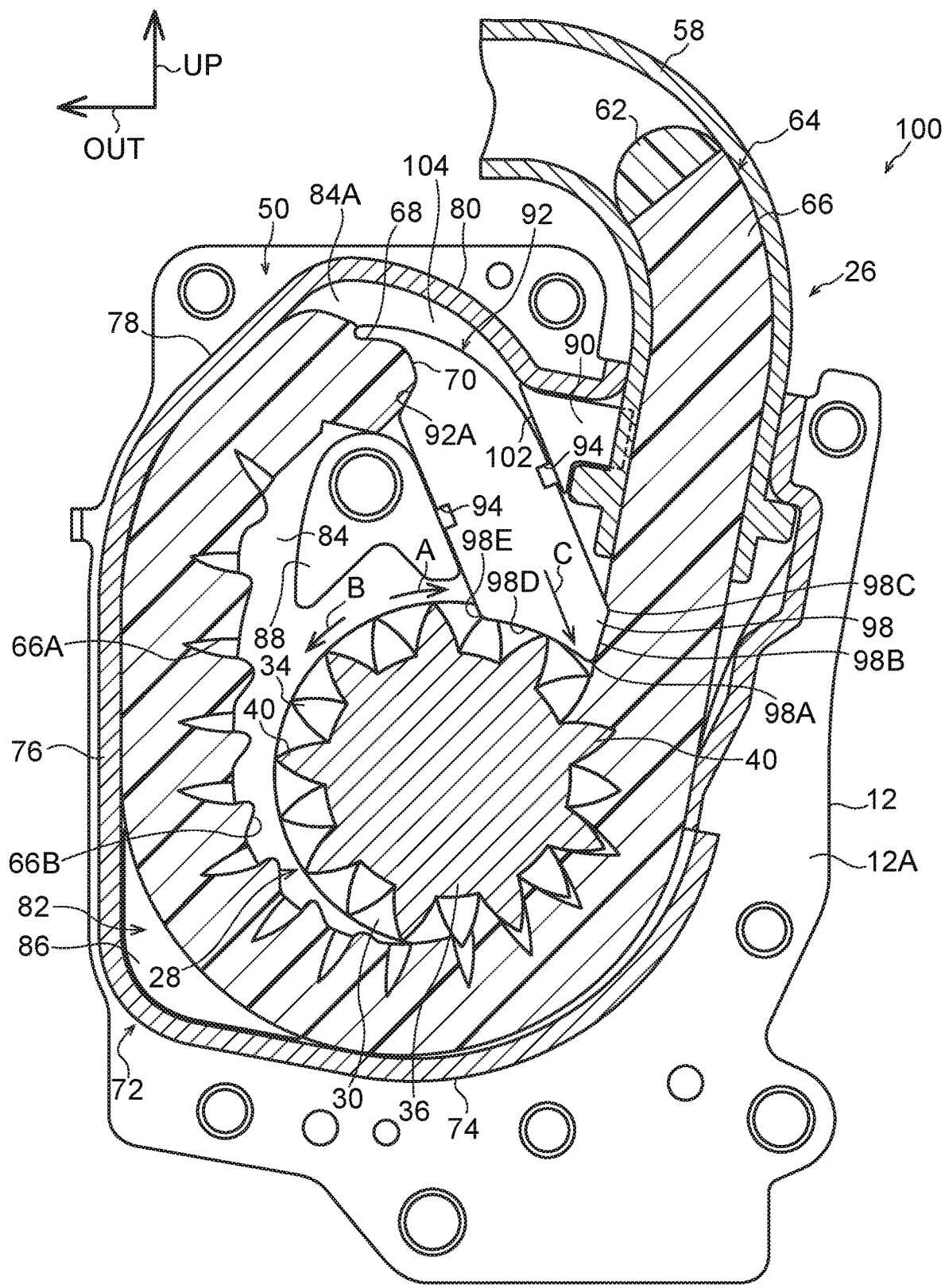
FIG. 12 is a side view that corresponds to FIG. 11 and shows a state in which the stopper, which is pushed by the conical portion of the moving member, is moved and abuts the moving member main body of the moving member.
Figure 13:
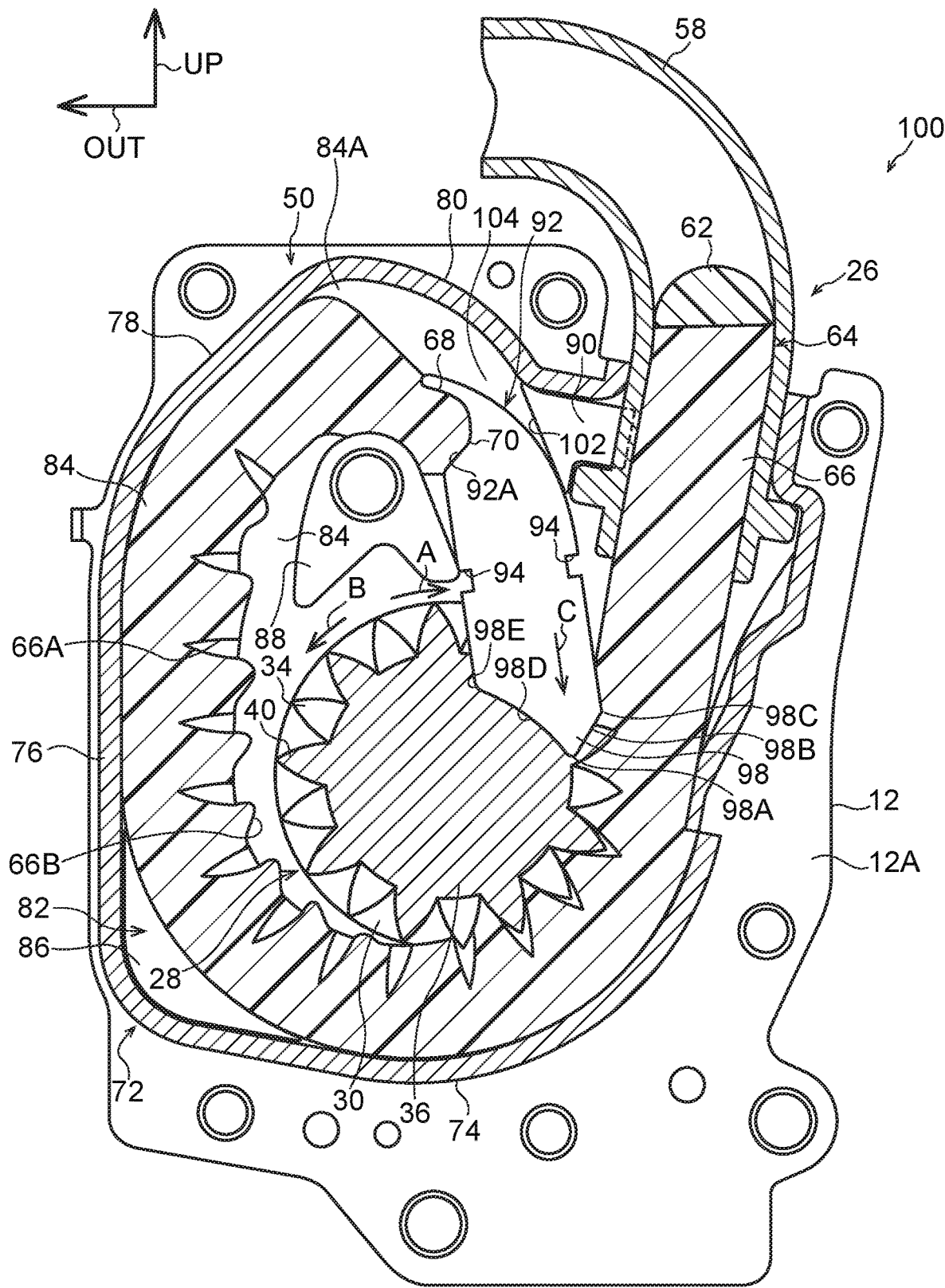
FIG. 13 is a side view that corresponds to FIG. 12 and shows a state in which the stopper has been moved to the portion of engagement of the moving member main body and the rotating member.

When the moving member 64 is pushed further by the sealing ball 62, due to the conical portion 70 of the moving member 64 pushing the stopper 92 in the state of being accommodated in the accommodating concave portion 92A of the stopper 92, the ribs 96 of the second guiding portion 88 and the third guiding portion 90 of the guide member 82 are sheared, and the stopper 92 is moved along the moving path 102 toward the vehicle lower side with respect to the vehicle transverse direction inner side, while being guided by the second guiding portion 88 and the third guiding portion 90 (see FIG. 12 and FIG. 13).

Therefore, in the same way as in the above-described first embodiment, the stopper 92 engages with the moving member main body 66 of the moving member 64 at between the axial direction distal end of the cylinder 58 and the portion of engagement of the first teeth 34 and the second teeth 40 of the rotating member 28 with the moving member main body 66, and expansion of the axial direction proximal end side portion of the moving member main body 66 toward the vehicle transverse direction outer side is suppressed, and movement of the axial direction proximal end side portion of the moving member main body 66 toward the axial direction distal end side is suppressed. Due thereto, the axial direction proximal end of the moving member 64 is disposed at the inner side of the cylinder 58.

Accordingly, in the present embodiment as well, operation and effects that are similar to those of the above-described first embodiment can be obtained.

Further, the conical portion 70 of the moving member 64 moves the stopper 92 in a state of being accommodated in the accommodating concave portion 92A of the stopper 92. Therefore, even in a case in which the moving direction of the conical portion 70 is changed from the vehicle upper side to the vehicle lower side with respect to the vehicle transverse direction inner side (refer to FIG. 10 through FIG. 13), displacement (separation) of the conical portion 70 from the accommodating concave portion 92A can be suppressed, and the conical portion 70 can efficiently move the stopper 92. Due thereto, the stopper 92 can efficiently suppress expansion of the axial direction proximal end side portion of the moving member main body 66 toward the vehicle transverse direction outer side, and can efficiently suppress movement of the axial direction proximal end side portion of the moving member main body 66 toward the axial direction distal end side, and can place the axial direction proximal end of the moving member 64 appropriately at the inner side of the cylinder 58.

Moreover, the conical portion 70 of the moving member 64 is fit-together with the accommodating concave portion 92A of the stopper 92 in a contracted state. Therefore, at the time when the conical portion 70 moves the stopper 92, deformation (contraction and the like) of the conical portion 70 can be suppressed, and the conical portion 70 can move the stopper 92 more efficiently.

Further, even if the stopper 92 is moved and a gap 104 arises between the stopper 92 and the side surface at the vehicle transverse direction inner side of the moving path 102 (the vehicle transverse direction outer side surfaces of the upper wall inner side portion 80 of the cover plate 50 and the third guiding portion 90 of the guide member 82), due to the conical portion 70 of the moving member 64 being accommodated in the accommodating concave portion 92A of the stopper 92 as described above, entry of the conical portion 70 into the gap 104 due to the length direction proximal end portion of the stopper 92 piercing the axial direction distal end side portion of the moving member 64 can be suppressed, and the conical portion 70 can still efficiently move the stopper 92.

Moreover, even if the length direction proximal end portion of the stopper 92 is, by the pressure from the conical portion 70 of the moving member 64, broken with the peripheral surface of the accommodating concave portion 92A being the starting point, and a separated portion separates from the length direction proximal end portion of the stopper 92, this separated portion is, by the axial direction distal end side portion of the moving member 64, accommodated in the gap 104 between the stopper 92 and the side surface at the vehicle transverse direction inner side of the moving path 102. Therefore, entry of the conical portion 70 into the gap 104 can still be suppressed, and the conical portion 70 can efficiently move the stopper 92.

Note that, in the above-described first embodiment and second embodiment, there is a structure in which the inner side proximal end 98C of the tapered portion 98 of the stopper 92 abuts the moving member main body 66 of the moving member 64 at between the axial direction distal end of the cylinder 58 and the portion of engagement of the first teeth 34 and the second teeth 40 of the rotating member 28 with the moving member 64. However, provided that the position of abutment of the stopper 92 at the moving member main body 66 of the moving member 64 is a position at which expansion of the moving member main body 66 toward a side in a direction orthogonal to the axis can be suppressed, the present invention can be applied without being limited to the region between the axial direction distal end of the cylinder 58 and the portion of engagement of the first teeth 34 and the second teeth 40 of the rotating member 28 with the moving member 64.

Moreover, in the above-described first embodiment and second embodiment, the tapered portion 98 of the stopper 92 that serves as an expansion limitier is simply made to be tapered toward the length direction distal end side of the stopper 92 (the side in the direction of arrow C in FIG. 2 and the like). However, for example, the distal end and the like of the tapered portion 98 may be made to be a wavy shape (a zigzag shape).

The disclosure of Japanese Patent Application No. 2017-150956 filed on Aug. 3, 2017 is, in its entirety, incorporated by reference into the present specification.

EXPLANATION OF REFERENCE NUMERALS

10 . . . webbing retractor, 18 . . . spool, 20 . . . webbing, 28 . . . rotating member, 58 . . . cylinder, 60 . . . micro gas generator (fluid supplier), 64 . . . moving member, 82 . . . guiding member (second expansion suppressor, expansion suppressor), 92 . . . stopper (first expansion suppressor, expansion suppressor), 92A . . . accommodating concave portion (accommodating portion), 100 . . . webbing retractor, 102 . . . moving path, 104 . . . gap

The invention claimed is:

1. A webbing retractor comprising:
a spool on which a webbing of a seatbelt device is taken up due to the spool being rotated in a take-up direction;
a rotating member that rotates toward one side such that the spool is rotated in the take-up direction;
a cylinder that is formed in a tubular shape;
a fluid supplier that is provided at an axial direction proximal end side of the cylinder, and that supplies fluid to an inner side of the cylinder at a time of a vehicle emergency;
a moving member that is provided at the inner side of the cylinder, and that, by pressure of the fluid, is moved toward an axial direction distal end side of the cylinder, and rotates the rotating member toward the one side; and an expansion suppressor that suppresses expansion, toward a side in a direction orthogonal to an axis, of the moving member by abutting or being abutted by the moving member that is in a state of having come out by a predetermined length from an axial direction distal end of the cylinder.

2. The webbing retractor of claim 1, wherein the expansion suppressor has a first expansion suppressor that abuts the moving member.

3. The webbing retractor of claim 2, wherein the first expansion suppressor abuts the moving member between the rotating member and the axial direction distal end of the cylinder.

4. The webbing retractor of claim 2, wherein the first expansion suppressor is moved toward a side of a portion of the moving member, which portion imparts rotational force to the rotating member.

5. The webbing retractor of claim 2, wherein the first expansion suppressor is made to be harder than the moving member.

6. The webbing retractor of claim 2, wherein the first expansion suppressor is made to have a shape that is tapered toward a moving member side.

7. The webbing retractor of claim 2, comprising an accommodating portion that is provided at the first expansion suppressor, and in which an axial direction distal end portion of the moving member is accommodated such that the first expansion suppressor is moved.

8. The webbing retractor of claim 7, wherein a moving direction of the axial direction distal end portion of the moving member is changed in a state in which the axial direction distal end portion of the moving member is accommodated in the accommodating portion.

9. The webbing retractor of claim 7, comprising a moving path along which the first expansion suppressor is moved, and at which a separated portion, which is formed by breakage that starts at the accommodating portion of the first expansion suppressor, can be accommodated between a side surface of the moving path and the first expansion suppressor.

10. The webbing retractor of claim 2, wherein the expansion suppressor has a second expansion suppressor, and a peripheral portion of the moving member can abut the second expansion suppressor.

* * * * *